United States Patent
Rohana et al.

(10) Patent No.: US 8,688,886 B1
(45) Date of Patent: *Apr. 1, 2014

(54) BUS TRANSACTION MAINTENANCE PROTOCOL

(75) Inventors: Tarek Rohana, Haifa (IL); Yuval Avnon, Tel-Aviv (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,639

(22) Filed: Aug. 7, 2012

Related U.S. Application Data

(63) Continuation of application No. 12/502,666, filed on Jul. 14, 2009, now Pat. No. 8,250,280.

(60) Provisional application No. 61/080,757, filed on Jul. 15, 2008.

(51) Int. Cl.
- *G06F 13/36* (2006.01)
- *G06F 13/20* (2006.01)
- *G06F 13/00* (2006.01)

(52) U.S. Cl.
USPC ........... 710/311; 710/306; 710/313; 710/315; 710/317

(58) Field of Classification Search
USPC ................ 710/105–106, 305–307, 310–311, 710/313–317, 52, 57
See application file for complete search history.

(56) References Cited

U.S. PATENT DOCUMENTS

| | | |
|---|---|---|
| 6,810,460 B1 | 10/2004 | Kirkwood |
| 2002/0174253 A1 | 11/2002 | Hayter et al. |
| 2005/0108482 A1 | 5/2005 | Fuks |
| 2007/0198762 A1 | 8/2007 | Xiong |
| 2007/0239966 A1 | 10/2007 | Georgiou et al. |
| 2008/0270667 A1 | 10/2008 | Bracamontes Del Toro |

*Primary Examiner* — Thomas J Cleary

(57) ABSTRACT

A system-on-a-chip (SOC) bridge is described that applies an adapted delay, or latency, to data transfers across the bridge to avoid data corruption without reducing data transfer performance. The adapted delay assures that a source SOC service device transferring data to a destination SOC service device via the bridge and an SOC crossbar bus does not prematurely assume that the data transfer is complete upon transferring the data to the bridge. The bridge causes wait states to be inserted into the transfer between the source SOC service device and the SOC bridge until the SOC bridge receives confirmation that the data has arrived at the destination SOC service device. The adapted delay assures that subsequent operations are not prematurely initiated by the source SOC service device and/or the SOC CPU that may interfere with the data transfer from the SOC bridge to the destination SOC service device, causing corrupted data.

18 Claims, 9 Drawing Sheets

BUS TRANSACTION MAINTENANCE PROTOCOL

INCORPORATION BY REFERENCE

This application is a continuation of U.S. patent application Ser. No. 12/502,666, filed on Jul. 14, 2009, which claims the benefit of U.S. Provisional Application No. 61/080,757, "METHOD FOR BUS TRANSACTION ORDERING MAINTENANCE PROTOCOL FOR AHG PROTOCOL AGENTS," filed by Tarek Rohana and Yuval Avnon on Jul. 15, 2008, which is incorporated herein by reference in its entirety.

BACKGROUND

A system-on-a-chip (SOC) refers to integrating various components of a computer or other electronic system into a single integrated circuit, or chip. An example SOC may contain a central processing unit (CPU) as well as one or more service devices depending on the intended function and use of the SOC. For example, SOC service devices may include, but are not limited to: a memory storage device, e.g., a double data rate (DDR) dynamic random access memory (DRAM) memory unit; a computer networking interface device, e.g., a Gigabit Ethernet unit; a local device interface that supports connectivity to local input/output devices, e.g., a keyboard, mouse, printer; an extended system bus interface, e.g., a Peripheral Component Interconnect (PCI) or PCI Express bus; and a high-speed input/out interface, e.g., FireWire or Universal Serial bus (USB).

A system-on-a-chip may include a configurable high-performance system backbone bus, or crossbar bus, that allocates connectivity between the CPU and the respective SOC service devices as a shared resource. A crossbar bus typically includes an arbiter module that communicates with the CPU and SOC service devices via a predetermined signal interface to receive requests for bus access. Access to the bus may be based on a set of predetermined rules and priorities. Once a bus access request is allowed between two SOC components, the arbiter module may establish physical connectivity between the devices identified in the bus access request by controlling one or more multiplexers to establish electrical signal connectivity between the respective devices. A system-on-a-chip may include service modules and protocol modules, for example for data transfer, that are part of units whose operation may not be optimal.

SUMMARY

A system-on-a-chip (SOC) bridge is described that applies an adapted delay, or latency, to data transfers across the bridge to avoid data corruption without reducing data transfer performance. The adapted delay assures that an SOC service device transferring data to a destination SOC service device via the bridge and an SOC crossbar bus does not prematurely assume that the data transfer is complete upon transferring the data to the bridge. The bridge causes wait states to be inserted into the transfer between the source SOC service device and the SOC bridge until the SOC bridge receives confirmation that the data has arrived at the destination SOC service device. The adapted delay assures that subsequent operations are not prematurely initiated by the source SOC service device, and/or the SOC CPU, that may interfere with the data transfer from the SOC bridge to the destination SOC service device, resulting in corrupted data.

Strict control of crossbar bus read and write transactions is critical to the maintenance of data integrity with respect to data, e.g., software, control parameters, data stores, etc., stored by the respective SOC service devices. Unfortunately, the introduction of a bridge delay, as addressed above, may result in the SOC system processing corrupted data. Previous attempts to avoid data corruption due to SOC bridge delays have included configuring a transmitting service device with a predetermined latency after completion of a write operation in order to allow the write transfer to complete at the destination service device. However, if such a predetermined is not sufficiently long to handle a worst case SOC bridge delay, data corruption may still occur. If such a predetermined latency is made sufficiently long to handle a worst case SOC bridge delay, the impact on overall SOC bridge transfer performance may be significant and may significantly reduce the operational performance of the SOC system as a whole.

The described (SOC) bridge supports an adapted delay that assures that sufficient time is provided for a write operation to complete without introducing unnecessary performance delays.

In one example embodiment a system-on-a-chip is described that may include, a crossbar bus that may provide connectivity between a first service device and a plurality of second service devices, a bridge module disposed between the crossbar bus and the first service device that may receive a block of data from the first service device via a first interface protocol and may forward the received block of data via the crossbar bus to a selected second service device in accordance with a second interface protocol, and a data transfer monitor associated with the bridge module, the data transfer module configured to monitor a transfer state of the block of data from the first service device to the second service device via the bridge module and the crossbar bus and configured to cause the bridge module to provide a signal to the first service device that is indicative of a completed transfer of the received block of data based on the monitored transfer state.

In a second example embodiment, a service device interface module for use within a system-on-a-chip that includes a plurality of service devices is described that may include, a bridge module disposed between a crossbar bus of the system-on-a-chip and a first service device of the of the plurality of service devices that may receive a block of data from the first service device via a first interface protocol and may forward the received block of data via the crossbar bus to a selected second service device of the plurality of service devices in accordance with a second interface protocol, and a data transfer monitor associated with the bridge module, the data transfer module configured to monitor a transfer state of a block of data from the first service device to the second service device via the bridge module and the crossbar bus and to cause the bridge module to provide a signal to the first service device that is indicative of a completed transfer of the received block of data based on the monitored transfer state.

In a third example embodiment, a method of controlling a duration allowed by a first service device for a data transfer from the first service device to a second service device via a bridge module and a crossbar bus is described that may include, receiving a block of data from the first service device via a first interface protocol and forwarding the received block of data via the crossbar bus to the second service device in accordance with a second interface protocol, and monitoring a transfer state of the block of data after the block of data transfers from the first service device to the second service device via the bridge module and the crossbar bus, and providing a signal to the first service device that is indicative of a completed transfer of the received block of data based on the monitored transfer state.

BRIEF DESCRIPTION OF THE DRAWINGS

Example embodiments of a system-on-a-chip (SOC) bridge are described hereinbelow with reference to the following drawings, wherein like numerals designate like elements, and wherein.

DETAILED DESCRIPTION OF EMBODIMENTS

Figure 1:
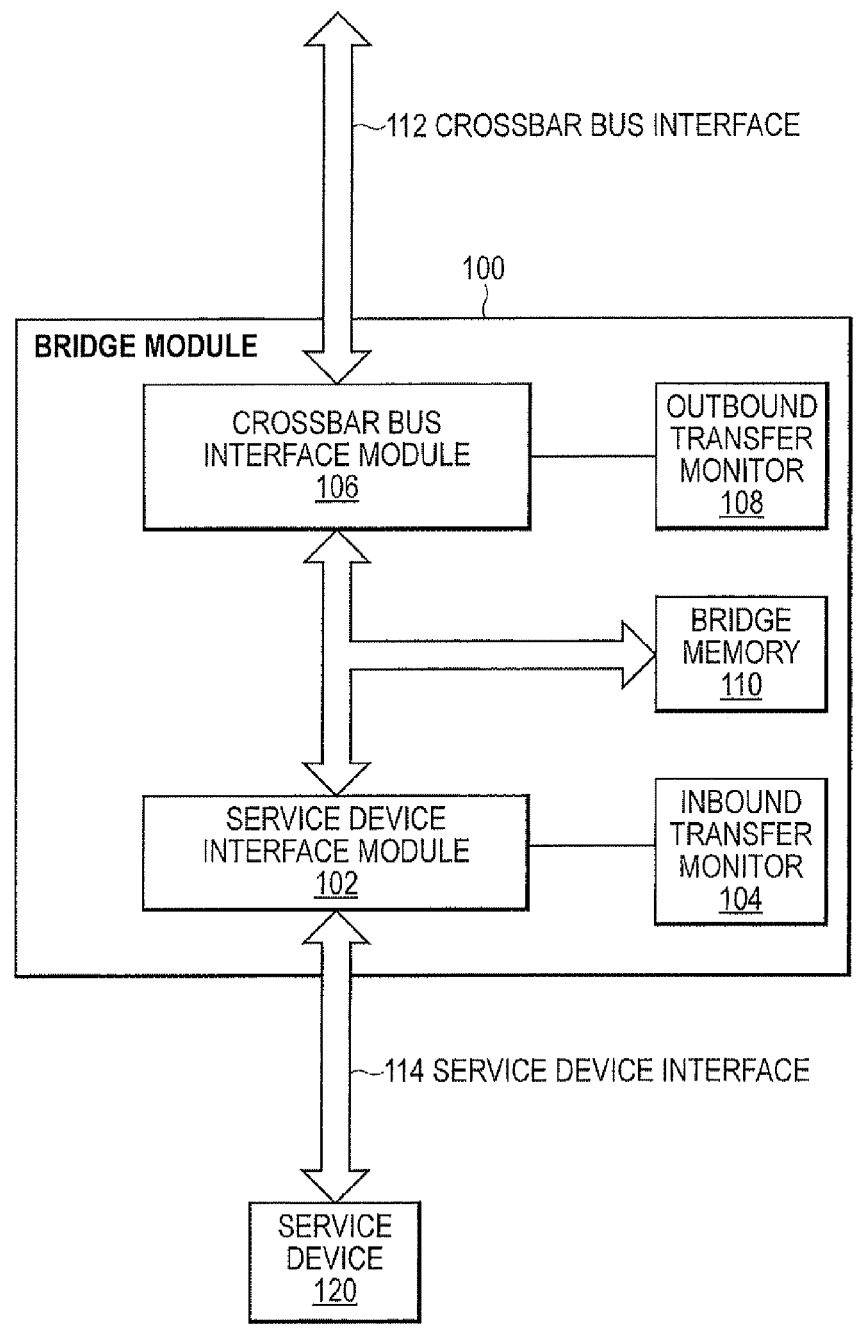
FIG. 1 is a block diagram of an example SOC bridge module configured in accordance with a first embodiment of the disclosure.

FIG. 1 is a block diagram of an example embodiment SOC bridge module configured in accordance with an embodiment of the disclosure. An SOC bridge module may perform translation services and applies an adapted delay, or latency, to data transfers, i.e., a transfer of a block of data, across the SOC bridge. For example, the SOC bridge module may monitor a transfer state of a block of data from a first SOC service device that supports a first crossbar bus protocol to a second SOC service device via an SOC crossbar bus (not shown) that is configured to communicate with SOC service devices that support a second SOC crossbar bus protocol. On detecting that a last portion of a block of data has been received by the SOC bridge module, the SOC bridge module may cause a signal to be provided to the first SOC service device that inserts a wait state into the data transfer process and may periodically provide the signal to the first SOC service device to re-assert, or extend, the wait state inserted into the data transfer process until the SOC bridge module determines that the entire block of data has been transmitted from the SOC bridge module. On detecting that a last portion of a block of data has been transmitted from the SOC bridge module, the SOC bridge module may cause a signal to be provided to the first SOC service device that is indicative of a completed transfer and that de-asserts the wait state previously inserted into the data transfer process.

In the example embodiment of a SOC bridge module configured in accordance with a first embodiment of the disclosure, described below with respect to FIG. 1, it is assumed that the bridge module is not a closed module, i.e., the bridge module may be modified to include features described below with respect to FIG. 1, such as the addition of an outbound transfer monitor, the addition of an inbound transfer monitor, as well as other features, that provide the described capabilities. Embodiments in which the bridge module is assumed to be a closed module are described below with respect to FIG. 2 and FIG. 3. Both embodiments, however, monitor a transfer state of a block of data and send a first signal to a service device from which data has been received to insert one or more wait states into the data transfer process upon determining that the data block has been received by, or ingressed into, the bridge module, and both embodiments send a second signal to the service device from which data has been received to de-assert the one or more wait states upon determining that the data block has been transmitted from, or egressed from, the bridge module.

As shown in FIG. 1, example embodiment SOC bridge module 100 may include a service device interface module 102, an inbound transfer monitor 104, a crossbar bus interface module 106, an outbound transfer monitor 108 and a bridge memory 110.

Service device interface module 102 may communicate with a service device 120 using a first high-performance system backbone service device interface 114 with which the service device 120 was designed to communicate. From the perspective of the service device 120, service device interface module 102 may behave no differently than an SOC crossbar bus implementing the same service device interface 114. In one example embodiment, for example, service device interface module 102 may communicate with the service device using the Advanced High-performance Bus (AHB) interface, an example of which is defined by the Advanced Microcontroller Bus Architecture (AMBA) specification (Revision 2.0). A service device interface module 102 configured to communicate with a service device using the AHB interface may communicate with any service device designed to communicate with an SOC crossbar bus using the AHB compliant interface.

Service device interface module 102 may include, or may be associated with, an inbound transfer monitor 104. As described in greater detail below, inbound transfer monitor 104 may monitor an ingress of a block of data from the SOC service device to service device interface module 102 and may alert service device interface module 102 when the entire block of data has been received by service device interface module 102. In accordance with an embodiment, upon receiving an indication from inbound transfer monitor 104 that an entire block of data in a transfer has been received, service device interface module 102 may issue an interface compliant signal to service device 120 that inserts a wait state into the data transfer, essentially stalling, or extending the data transfer. Service device interface module 102 may continue to assert wait states into the data transfer, until the bridge module receives a signal from outbound transfer monitor 108 that the entire block of data has been successfully transferred from the bridge module to the destination service device, as described in greater detail below. Once the entire block of data associated with a data transfer has been successfully transferred from bridge module 100, service device interface module 102 may discontinue inserting wait states into the data transfer, and the data transfer is allowed to terminate normally.

For example, in one example embodiment, inbound transfer monitor 104 may monitor a flow of bits associated with a data transfer from SOC service device 120 to service device interface module 102, and may alert service device interface module 102 when a last bit of the block of data has been received. In accordance with such an embodiment, upon receiving an indication from inbound transfer monitor 104 that the last bit in a transfer has been received, service device interface module 102 may issue an interface compliant signal to service device 120 that inserts a wait state into the data transfer, essentially stalling, or extending the data transfer. Service device interface module 102 may continue to assert wait states into the data transfer, until the bridge module receives a signal from outbound transfer monitor 108 that the last bit has been successfully transferred from the bridge module to the destination service device, as described in greater detail below. Once the last bit of the block of data has been successfully transferred, service device interface module 102 may discontinue inserting wait states into the data transfer, and the data transfer is allowed to terminate normally.

Crossbar bus interface module 106 may communicate with the SOC crossbar bus (not shown) using a second high-performance system backbone service device interface protocol 112 with which the SOC crossbar bus was designed to communicate. From the perspective of the crossbar bus, crossbar bus interface module 106 may behave no differently than an SOC service device implementing the same crossbar bus interface protocol.

Crossbar bus interface module 106 may include or be associated with an outbound transfer monitor 108. As described in greater detail below, outbound transfer monitor 108 may monitor an egress of the block of data from crossbar bus interface module 106 to the crossbar bus and may alert service device interface module 102 when the entire block of data has been transmitted from the SOC bridge. In accordance with an embodiment, upon receiving an indication from outbound transfer monitor 108 that an entire block of data in a transfer has been transmitted from the bridge module, service device interface module 102 may issue an interface compliant signal to the service device that de-asserts the wait state previously inserted into the data transfer, as described above, thereby allowing the data transfer to terminate normally.

For example, in one example embodiment, outbound transfer monitor may monitor a flow of bits associated with a data transfer from crossbar bus interface module 106 to a destination SOC service device via the SOC crossbar bus and may alert crossbar bus interface module 106 when the last bit has been successfully transferred to the destination service device. For example, in one example embodiment, outbound transfer monitor 108 may notify crossbar bus interface module 106 when the last bit associated with a data transfer to service device interface module 102 and stored in bridge memory 110 has been transferred by crossbar bus interface module 106. In another example embodiment, outbound transfer monitor 108 may notify crossbar bus interface module 106 upon receipt of a crossbar bus interface signal from the destination SOC service device indicating that the destination service device has successfully received the last bit of data that outbound transfer monitor 108 associates with a data transfer. Once crossbar bus interface module 106 learns that data transfer has been completed, crossbar bus interface module 106 may inform service device interface module 102 that the data transfer is complete and service device interface module 102 may discontinue inserting wait states into the data transfer, thereby allowing the data transfer to terminate, as described above.

In accordance with one example embodiment, bridge memory 110 may provide bridge 100 with a first-in-first-out data store that both service device interface module 102 and crossbar bus interface module 106 may use to support store and forward data transfers through bridge module 100. For example, as data is received by service device interface module 102 as part of a new data transfer from an SOC service device, service device interface module 102 may store the data to bridge memory 110 and may notify crossbar bus interface module 106 that a new data transfer has been initiated. Upon notification that a data transfer is has been initiated, crossbar bus interface module 106 may submit a bus access request to the SOC crossbar bus to the identified destination service device, and upon gaining access to the bus may begin passing data bits to the destination service device from bridge memory 110.

Through the services, described above, provided by service device interface module 102 and crossbar bus interface module 106, SOC bridge module 100 may provide translation and data transport services between a between an SOC service device that supports a first crossbar bus protocol and an SOC crossbar bus configured to communicate with SOC service devices using a second SOC crossbar bus protocol. In accordance with an embodiment, the SOC bridge module may be configured to monitor data transfer operations and may insert wait states into the data transfer of the data transfer, as needed, to allow the bridge module complete a data transfer to a destination SOC service device before allowing the source SOC service device to assert that the data transfer is complete.

Service device interface module 102 may communicate with an SOC service device using an SOC crossbar bus interface that the SOC service device is configured to communicate with. Service device interface module 102 may receive bus requests from the SOC service device and may and grant bus access to the SOC service device. Bus request data and control phase data may be received by service device interface module 102 and transferred to crossbar bus interface 106 either directly, or using a store and forward approach via bridge memory 110. For example, service device interface module 102 may store bus request data and control phase data in bridge memory 110 and notify crossbar bus interface 106 of the data, thereby allowing crossbar bus interface 106 to access the data when crossbar bus interface 106 is ready for the data.

During a data transfer process, service device interface module 102 may receive an indication from bridge memory 110 that the bridge memory is full. Such a condition may arise if crossbar bus interface module 106 is unable to obtain bus access via the SOC crossbar bus, temporarily loses bus access due to heavy congestion on the crossbar bus and/or the destination SOC service device is busy or congested, and is therefore unable to remove data previously put to bridge memory 110 by service device interface module 102. Alternatively, service device interface module 102 may receive an indication from crossbar bus interface module 106 to temporarily delay attempting to send further data, due to similar congestion. In response to such indications of delays in the ability of bridge module 100 to pass data, service device interface module 102 may insert a wait state into the data transfer by transmitting to the service device a signal, that is in compliance with service device interface 114, that causes the service device to insert a wait state into the data transfer.

Further, as described above, service device interface module 102 may receive a notification from inbound transfer monitor 104 that a block of data associated with a data transfer has been ingressed to the bridge. For example, in one embodiment, inbound transfer monitor 104 may compare the number of bits received by service device interface module 102, and/or placed by service device interface module 102 into bridge memory 110, to a size of the data transfer included in control data received from service device 120 and associated with the transfer. If the number of bits received is equal to the size of the data to be transferred, inbound transfer monitor 104 may notify service device interface module 102 that the last bit of the data transfer has been received. Alternatively, assuming that service device interface 114 includes separate control data lines and data write lines, inbound transfer monitor 104 may monitor the control signals received from SOC service device 120 on the control lines and may notify service device interface module 102 when the control lines indicate that a new data transfer is about to be initiated, thereby indicating that the last bits associated with the previous data transfer have been transferred to bridge 100.

Upon receiving a notification from inbound transfer monitor 104 that the block of data associated with a current data transfer has been transferred to, or ingressed by bridge 100, service device interface module 102 may insert a wait state into the data transfer by transmitting to service device 120 a signal, in compliance with service device interface 114, that causes the service device to insert a wait state into the current data transfer. Using such a technique, service device interface module 102 may continue to insert wait states into the data transfer until an indication is received from crossbar bus interface module 106 that the block of data associated with the data transfer has been successfully transferred across the SOC crossbar bus.

The number of wait states inserted by service device interface module 102 is determined by how much time is required for the block of data associated with the data transfer to be delivered across the crossbar bus, and therefore may adaptively change based on such factors as the level of congestion on the crossbar bus and/or the priority assigned to the data transfer by the cross bus arbiter relative to other bus requests submitted to the crossbar bus arbiter by other SOC service devices, etc. The adapted delay inserted into the data transfer is no longer than the period of time required to assure that the data transfer is actually completed. Therefore, the adapted delay protects against compromises of data integrity, as addressed above, yet does not unnecessarily reduce the efficiency of the data transfer process as would previously used techniques, such as the insertion of a long fixed duration wait state at the end of every data transfer, as described above.

Crossbar bus interface module 106 may manage data transfers between SOC bridge module 100 and an SOC crossbar bus using an SOC crossbar bus interface that is supported by the SOC crossbar bus. For example, in response to control parameters received from service device interface module 102 related to a data transfer to bridge 100 from SOC service device 120, crossbar bus interface module 106 may initiate a bus request to the crossbar bus and, once bus access is obtained, may proceed to pass data to a destination SOC service device via the SOC crossbar bus in accordance with the crossbar bus interface. For example, assuming that service device interface module 102 has stored data related to a data transfer in bridge memory 110, once crossbar bus interface module 106 has negotiated bus access, crossbar bus interface module 106 may retrieve data associated with the data transfer from bridge memory 110 and may format and transmit crossbar bus interface compliant data write signals across the crossbar bus to a destination service device.

During a data transfer process, crossbar bus interface module 106 may receive a notification from outbound transfer monitor 108 that the data block associated with a current data transfer has been transferred from bridge 100. In one example embodiment, outbound transfer monitor 108 may compare a number of bits transferred by crossbar bus interface module 106 and/or retrieved by crossbar bus interface module 106 from bridge memory 110 to a size of the data transfer provided in control data associated with the transfer passed to outbound transfer monitor 108 by service device interface module 102. In such an embodiment, if the number of bits transferred is equal to the size of the data to be transferred, outbound transfer monitor 108 may notify crossbar bus interface module 106 that the last bit of the data transfer has been transferred from bridge 100. Alternatively, in another example embodiment, outbound transfer monitor 108 may monitor the control signals received from the SOC destination service device and may notify crossbar bus interface module 106 when the control signals indicate that the last bits associated with a data transfer have been received by the destination service device. Upon determining that the block of data associated with a data transfer have been successfully transferred from bridge 100, crossbar bus interface module 106 may notify service device interface module 102 that the block of data associated with the data transfer has been successfully transferred, thereby allowing service device interface module 102 to stop asserting wait states into the data transfer, as described above.

Figure 2:
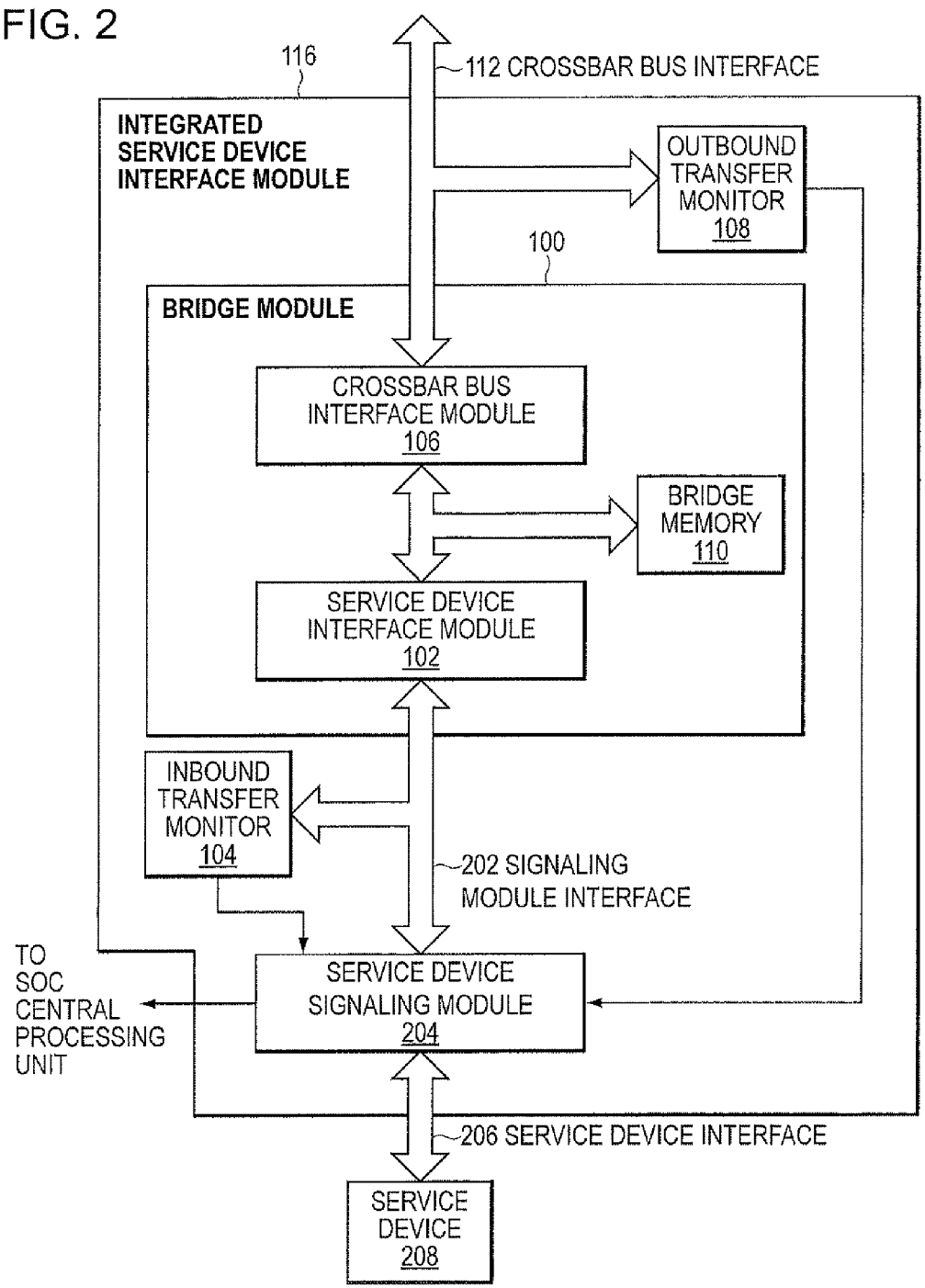
FIG. 2 is a block diagram of an example SOC integrated service device interface module that provides the same capability as the SOC bridge module for FIG. 1 configured in accordance with a second embodiment of the disclosure.
Figure 3:
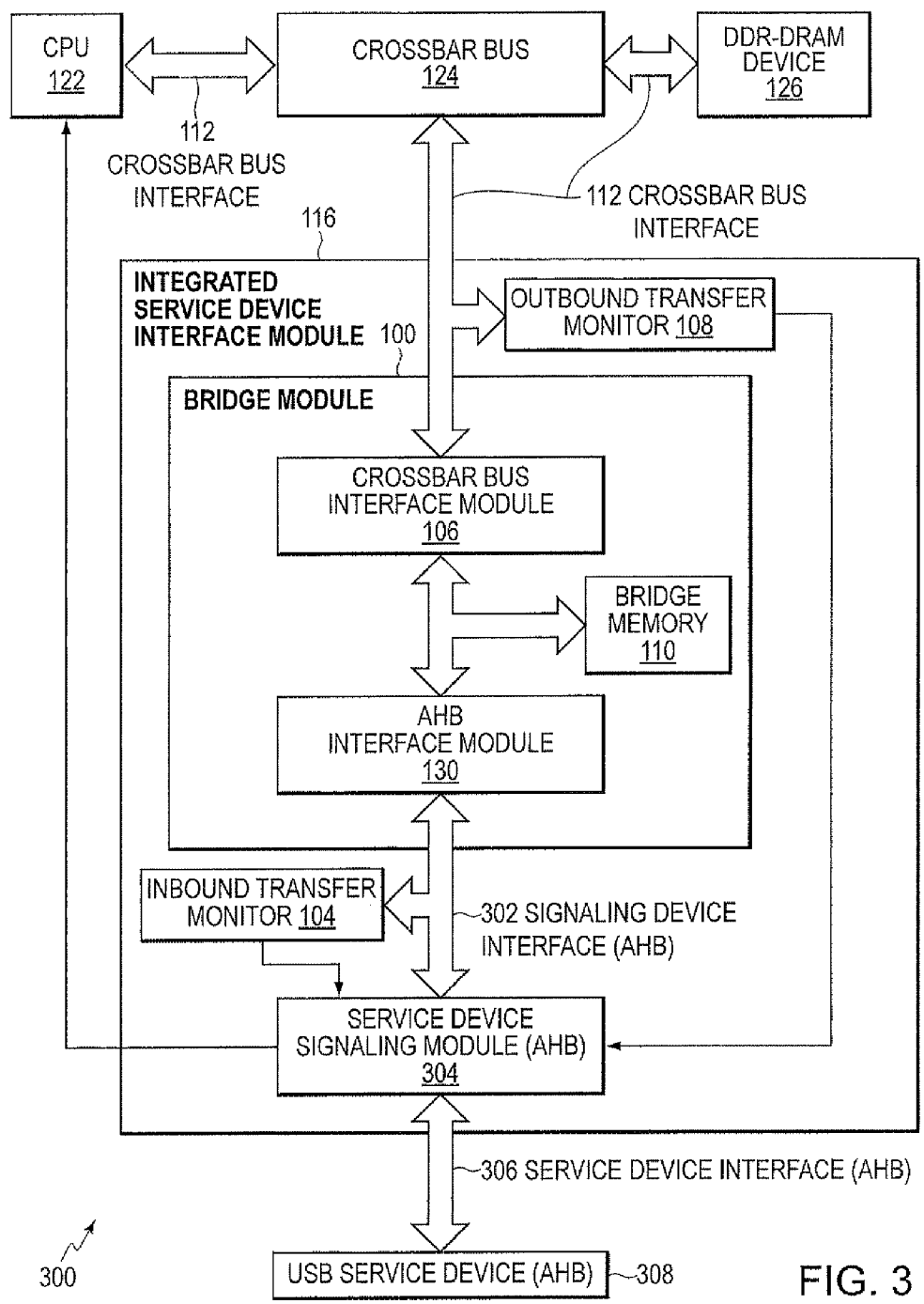
FIG. 3 is a block diagram of the SOC integrated service device interface module of FIG. 2 in a first example SOC system that further includes a CPU, a crossbar bus and a second SOC service device.

As addressed above, FIG. 2 and FIG. 3 present embodiments configured in accordance with a second embodiment of the disclosure in which the bridge module is assumed to be closed, i.e., not available for modification. Therefore, in the embodiments described with respect o FIG. 2 and FIG. 3, the functionality described above with respect to FIG. 1 and implemented within the bridge module are implemented in modules that communicate with, but are external to, the bridge module. The closed bridge module and the modules added to the bridge module to replicate the same functionality described above with respect to FIG. 1 may be referred to collectively as an integrated service device interface module, as described in greater detail below.

FIG. 2 is a block diagram of an example SOC integrated service device interface module that includes a closed SOC bridge module. As shown in FIG. 2, SOC integrated service device interface module 116 may include a bridge module 100, a bridge memory 110, an outbound transfer monitor 108, a inbound transfer monitor 104, and a service device signaling module 204. Closed bridge module 100 is similar to the bridge described with respect to FIG. 1, except that outbound transfer monitor 108 and inbound transfer monitor 104 have been implemented as modules external to the bridge module. Service device signaling module 204 has been added to insert signals that may be used to insert one or more wait states into a data transfer process, as described above with respect o FIG. 1, based on a transfer state determined by outbound transfer monitor 108 and inbound transfer monitor 104, as described above. Inbound transfer monitor 104 and outbound transfer monitor 108 may monitor the transfer state of a data transfer and may inform service device signaling module 204 of transfer states that require an assertion or a de-assertion of wait states into a data transfer process, as described above.

As shown in FIG. 2, service device signaling module 204 may communicate with bridge module 100 via service device interface module 102 using signaling module interface 202 and may communicate with the SOC CPU via additional control lines connecting the service device signaling module 204 to the SOC CPU. Service device signaling module 204 may support a service device interface 206 that may be used to communicate with an SOC service device 208.

Once a selected service device signaling module 204 has been matched with an appropriate SOC bridge module 100, inbound transfer monitor 104, and outbound transfer monitor 108 to form an SOC integrated service device interface module116, the integrated service device interface module116 may be treated as a single unit and may be combined with an SOC base design to provide connectivity between the SOC crossbar bus and an SOC service device, such as service device 208 shown in FIG. 2. Matching service device signaling module 204, outbound transfer monitor 108, and inbound transfer monitor 104 with an SOC bridge module 100 results in an integrated service device interface module 116 that may transparently perform translation services and that may apply a adapted delay, or latency, as needed, to data transfers across the SOC bridge between the service device 208 and the SOC crossbar bus. Thus, integrated service device interface module116, increases transparency and increases reliability by reducing the likelihood that transferred data may be corrupted without adversely impacting data transfer efficiency. Further, integrated service device interface module116 transparently performs translation services and applies a adapted delay, or latency, as needed, without requiring any changes to bridge module 100 or to service device 208. Such an approach is particular useful is cases where the selected service device signaling module 204 is particularly complex and/or includes intellectual property that the SOC system designers are not authorized to modify.

In operation, service device 208 may communicate with integrated service device interface module 116 via service device signaling module 204 in the same manner as if service device 208 were communicating with an SOC crossbar bus. If service device interface 206 and signaling module interface 202 use the same interface protocol, service device signaling module 204 may serve as a pass-through interface between the service device 208 and the service device interface module 102 of bridge module 100. However, if service device interface 206 and signaling module interface 202 use different interface protocols, service device signaling module 204 may be configured to provide translation services between service device interface module 102 and service device 208. Regardless of whether translation services are provided by service device signaling module 204, upon receiving a notification from inbound transfer monitor 104 that a last portion of a block of data has been received by the SOC bridge module, service device signaling module 204 may cause a signal to be provided to service device 208 that inserts a wait state into the data transfer process and service device signaling module 204 may periodically provide the signal to the first SOC service device to re-assert, or extend, the wait state inserted into the data transfer process until service device signaling module 204 receives notification from outbound transfer monitor 108 that the entire block of data has been transmitted from the SOC bridge module. On detecting that a last portion of a block of data has been transmitted from the SOC bridge module, service device signaling module 204 may cause a signal to be provided to service device 208 that is indicative of a completed transfer and that de-asserts the wait state previously inserted into the data transfer process. Further, on detecting that a last portion of a block of data has been transmitted from the SOC bridge module, service device signaling module 204 may cause a signal to be provided to the SOC central processing unit (CPU) to inform the CPU that the transferred data is available for access.

For example, in an integrated service device interface module 116 embodiment in which service device 208 is a Universal Serial bus (USB) device and service device interface 206 and signaling module interface 202 are both the Advanced High-performance Bus (AHB) interface, service device signaling module 204 may transmit an HREADY signal to service device signaling module 204 to insert one or more wait states into a data transfer and to apply a adapted delay, or latency, as needed, at the end of each data transfer. Details related to the HREADY signal and the AHB interface are published in the Advanced Microcontroller Bus Architecture (AMBA) Specification (Revision 2.0), selected details of which are addressed in greater detail below. However, embodiments of service device interface module 116 that support adapted delay, or latency, at the end of each data transfer, based on inbound and outbound data transfer monitoring is not limited to use with the AHB interface. The approach may be used with any configurable high-performance system backbone bus interface, or crossbar bus interface supported by service 208 that allows an SOC destination service device to instruct, or request, the SOC source service device to insert a wait state, or delay, in a data transfer.

FIG. 3 is a block diagram of the SOC integrated service device of FIG. 2 in a first example SOC system that further includes a CPU 122, a crossbar bus 124 and a second SOC service device, namely a DDR-DRAM device module 126. In addition, in the example SOC system 300, the generic service device interface module 102 of FIG. 2, has been replaced with an AHB interface module 130, the generic signaling module interface 202 of FIG. 2 has been replaced with an AHB signaling device interface 302, the generic service device signaling module 204 of FIG. 2 has been replaced with an AHB service device signaling module 304, and the generic service device 208 of FIG. 2 has been replaced with an AHB USB service device 308.

As shown in FIG. 3, CPU 122, DDR-DRAM device 126 and integrated service device interface module116 support a common crossbar bus interface 112 that allows the respective devices to communicate via a bus path allocated via crossbar bus 124. In such an embodiment, AHB service device signaling module 304 may transmit an HREADY signal to USB service device (AHB) 308 to insert one or more wait states into a data transfer and to apply an adapted delay, or latency, as needed, at the end of each data transfer, as described with respect to FIG. 1 and FIG. 2, above.

Figure 4:
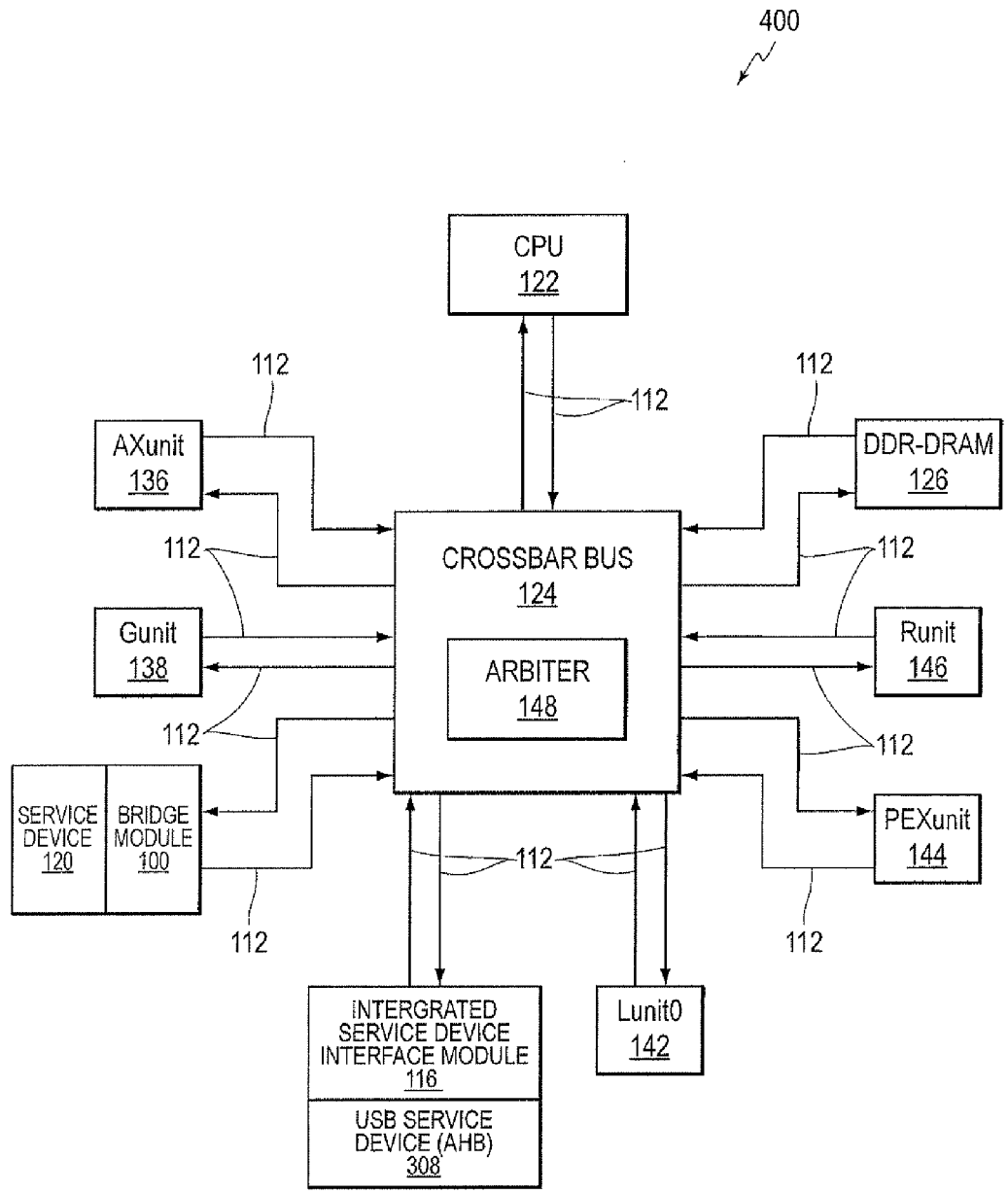
FIG. 4 is a schematic diagram of a second example SOC system that includes a CPU, a crossbar bus and multiple example SOC service devices, and which includes the SOC bridge module of FIG. 1 and the SOC integrated service device interface module of FIG. 2.

FIG. 4 is a schematic diagram of a second example SOC system 400 that includes CPU 122, a crossbar bus 124 with arbiter 148, the bridge module 100 of FIG. 1 and the SOC integrated service device interface module 116 of FIG. 2 and FIG. 3. Further, second example SOC system 400 includes multiple example SOC service devices, including DRR DRAM memory device 126, a DMA control device (AXunit) 136, a Gigabit Ethernet device (Gunit) 138, a PCI bus interface (Lunit0)142, a PCI Express bus interface (PEXunit) 144, and a local device interface (Runic) 146 that supports connectivity to local input/output devices, e.g., a keyboard, mouse, printer, etc., a generic services device 120 that connects to crossbar bus 124 via bridge module 100, as described above with respect to FIG. 1, and an AHB USB service device 308 that connects to crossbar bus 124 via integrated service device interface module 116, as described with respect to FIG. 3 above.

Second example SOC system 400 as shown in FIG. 4, and as described above, provides an overview of the type of complex systems that may be assembled by starting with an SOC system base design and including a selection of sophisticated SOC service devices capable of communicating via the base design crossbar bus. Bridge module 100 and integrated service device interface module 116 facilitate the seamless and transparent integration of service devices, that do not support a native crossbar interface of an SOC system base design, into a robust SOC system without increasing the risk of data corruption or adversely impacting system performance, as described above. Some of the service devices shown in FIG. 4 may be configured as master devices, i.e., devices capable of initiating a bus request and controlling a transfer of data via a data transfer. Others of the service devices shown in FIG. 4 may be configured as slave devices, i.e., devices capable of only responding to read and/or write requests initiated by the crossbar bus by master devices. Still other of the service devices shown in FIG. 4 may be configured to act as both master devices and/or slave devices.

In the process flows described below with respect to FIG. 5 through FIG. 9, it may be assumed, for explanation purposes, that the inbound transfer monitor 104 and outbound transfer monitor 108 determine when a block of data has ingressed or egressed the bridge module based on tracking the last bit included in the block of data, as described above. However, as also described above, the inbound transfer monitor 104 and outbound transfer monitor 108 may determine the transfer state of a block of data using any number of techniques, and references to tracking a last bit in the processes described below should not be interpreted as excluding other techniques that may be used to determine a transfer state of a block of data associated with a data transfer.

Figure 5:
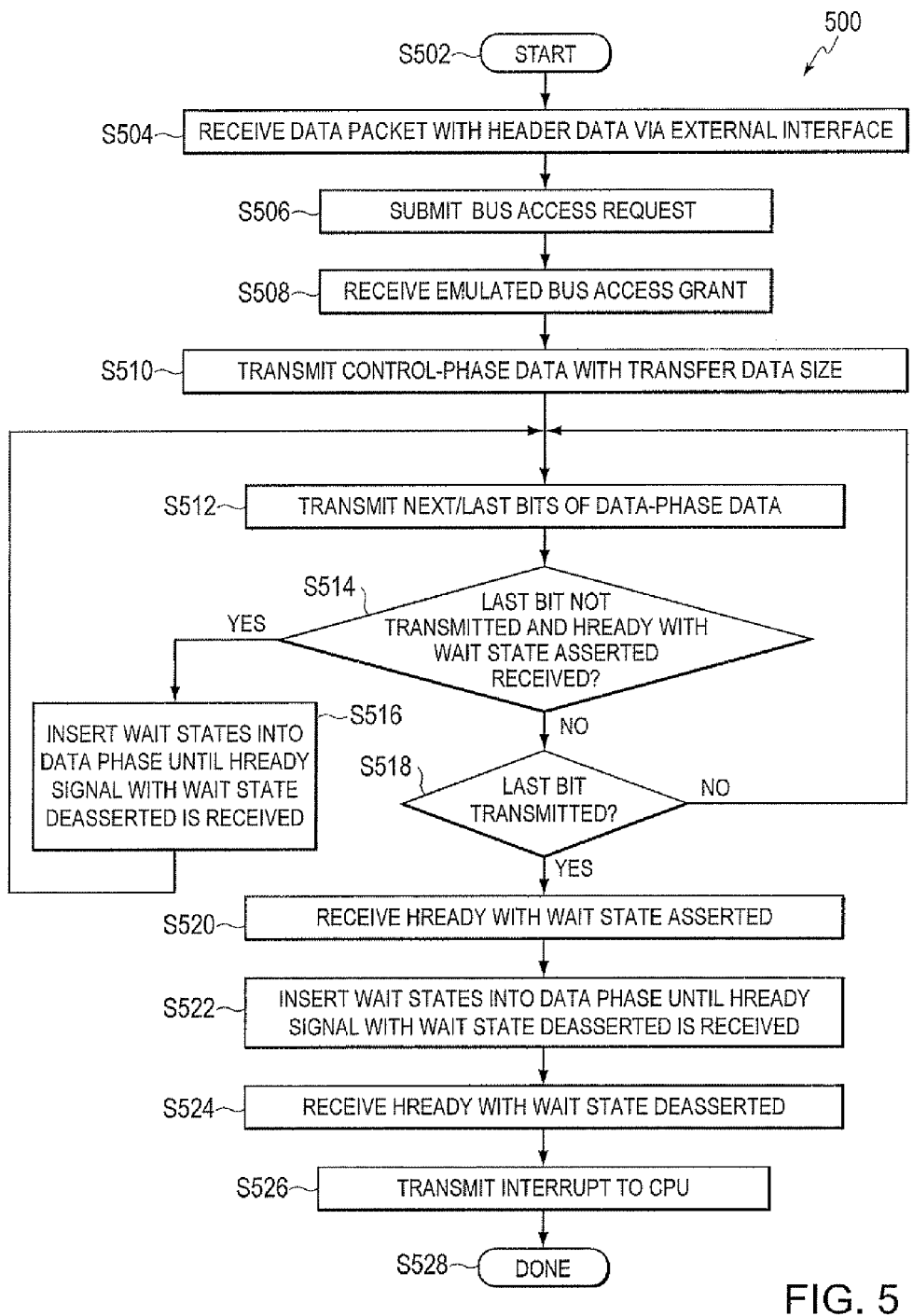
FIG. 5 is a flow-chart of an example process flow that may be performed by the SOC service device shown in FIG. 2.

FIG. 5 is a flow-chart of an example process flow that may be performed by SOC service device 120 of FIG. 1 to perform a data transfer via the SOC bridge module 100 of FIG. 1 and a SOC crossbar bus to a second SOC service device. It is assumed in the process flow shown in FIG. 5 that service device interface module 102 and service device 120 communicate via an AHB based interface, and that and that service device 120 supports an external bus. As shown in FIG. 5, operation of process 500 begins at step S502 and proceeds to step S504.

In step S504, service device 120 may receive a data packet with header data via an external bus interface (not shown), and operation of the process continues to step S506.

In step S506, service device 120 may submit a bus access request to SOC bridge module 100 via service device interface module 102, and operation of the process continues to step S508.

In step S508, service device interface module 102 may return to service device 120 a bus access grant, and operation of the process continues to step S510.

In step S510, service device 120 may submit to service device interface module 102 control phase data that may include address data and a write data size, e.g., in bits, of the data transfer, and operation of the process continues to step S512.

In step S512, service device 120 may begin to transfer a first/next set of write data bits to service device interface module 102, and operation of the process continues to step S514.

If, in step S514, service device 120 receives an AHB HREADY signal with a wait state asserted, and the last bit of the data transfer has not been transferred, i.e., bridge memory 110 is temporarily full, operation of the process continues to step S516; otherwise, operation of the process continues to step S518.

In step S516, service device 120 may wait for and receive an AHB HREADY signal with a wait state de-asserted, i.e., bridge memory 110 can accept data, and operation of the process continues to step S512.

If, in step S518, service device 120 determines that the last bit of the data transfer has not been transferred, operation of the process continues to step S512; otherwise, operation of the process continues to step S520.

In step S520, service device 120 may receive an AHB HREADY signal with a wait state asserted, and operation of the process continues to step S522.

In step S522, service device 120 may insert consecutive wait states into the data transfer until an AHB HREADY signal with a wait state de-asserted is received, and operation of the process continues to step S524.

In step S524, service device 120 may receive the awaited AHB HREADY signal with the wait state de-asserted, and operation of the process continues to step S526.

In step S526, service device 120 may send an interrupt signal to the SOC CPU to inform the CPU that the data transfer is complete, and operation of the process continues to step S528 and terminates.

Figure 6:
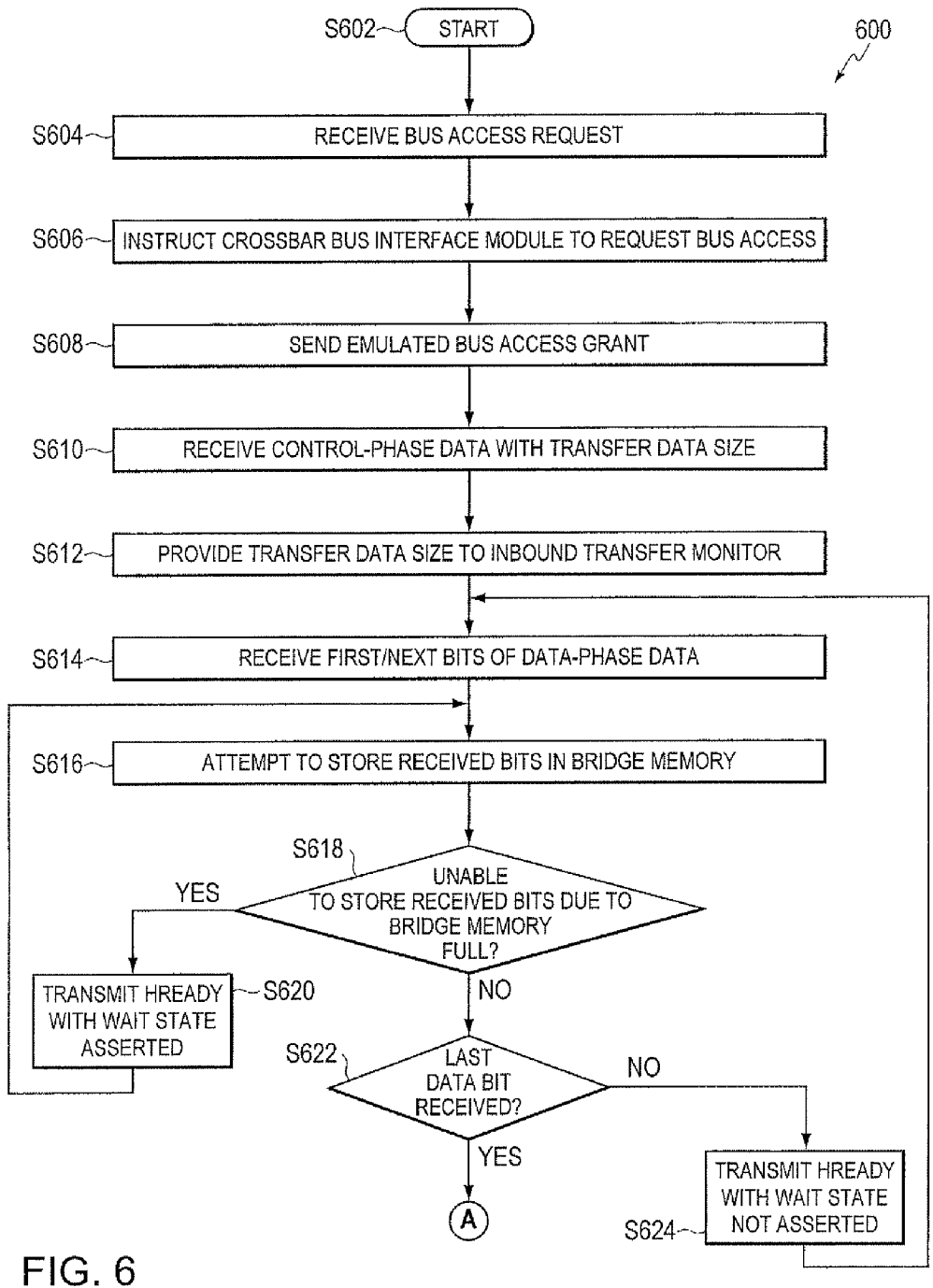
FIG. 6 and FIG. 7 are a flow-chart of an example process flow that may be performed by the SOC integrated service device interface module of FIG. 2.
Figure 7:
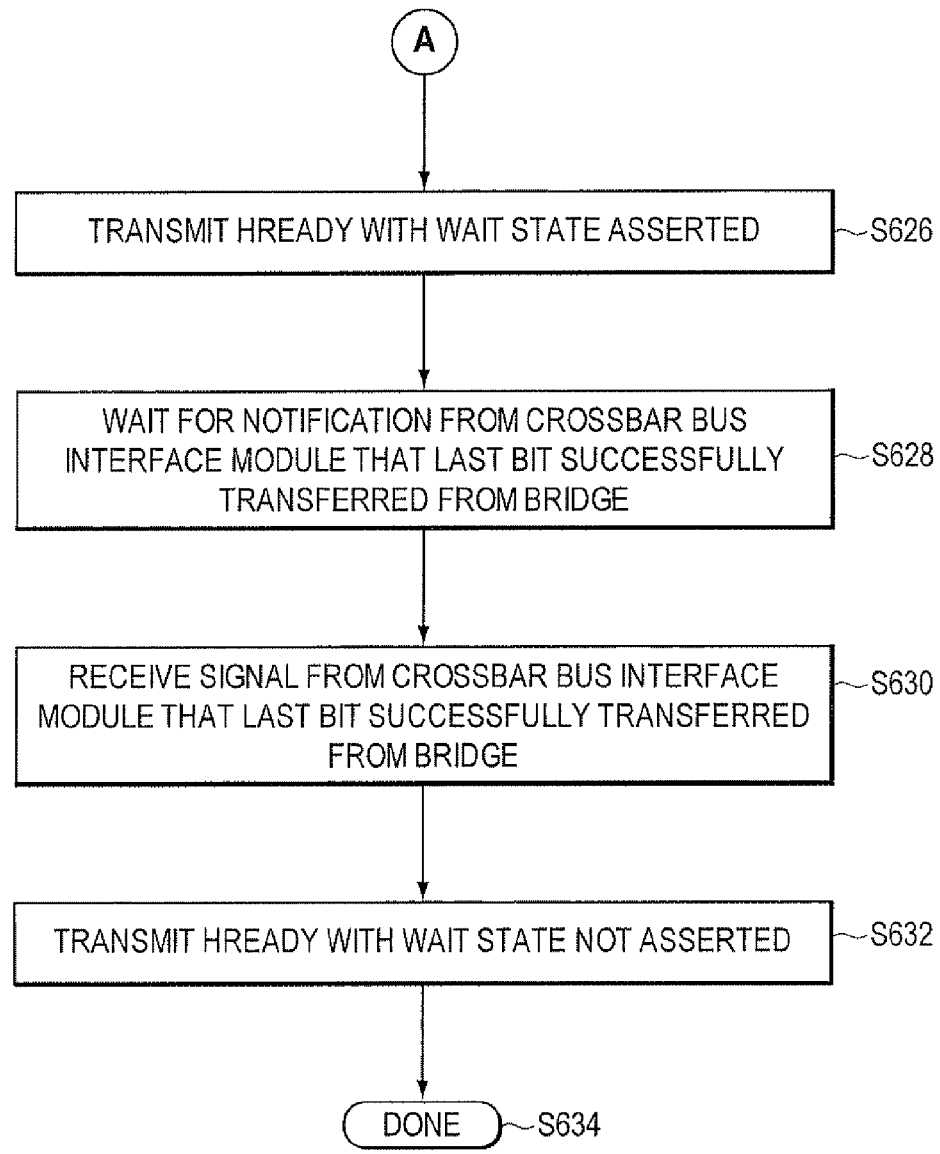

FIG. 6 and FIG. 7 are a flow-chart of an example process flow that may be performed by the SOC service device interface module 102 of FIG. 1. As in the process flow described above with respect to FIG. 5, is assumed that, in the process flow shown in FIG. 6 and FIG. 7, service device interface module 102 and service device 120 communicate via an AHB based interface, and that service device 120 supports an external bus (not shown). As shown in FIG. 6, operation of process 600 begins at step S602 and proceeds to step S604.

In step S604, service device interface module 102 may receive a bus access request from service device 120, and operation of the process continues to step S606.

In step S606, service device interface module 102 may direct crossbar bus interface module 106 to request bus access from the SOC crossbar bus, and operation of the process continues to step S608.

In step S608, service device interface module 102 may send a bus access grant to service device 120, and operation of the process continues to step S610.

In step S610, service device interface module 102 may receive from service device 120 control phase data that may include address data and a write data size, e.g., in bits, of the data transfer, and operation of the process continues to step S612.

In step S612, service device interface module 102 may provide the transfer data write transfer size to inbound transfer monitor 104 and outbound transfer monitor 108, and operation of the process continues to step S614.

In step S614, service device interface module 102 may begin to receive a first/next set of write data bits from service device 120, and operation of the process continues to step S616.

In step S616, service device interface module 102 may attempt to store the received write data bits in bridge memory 110, and operation of the process continues to step S618.

If, in step S618, service device interface module 102 determines that bridge memory 110 is full, operation of the process continues to step S620; otherwise, operation of the process continues to step S622.

In step S620, service device interface module 102 may transmit an AHB HREADY signal with a wait state asserted to service device 120, and operation of the process continues to step S616.

If, in step S622, service device interface module 102 determines, e.g., with the assistance of inbound transfer monitor 104 that a last bit associated with the data transfer has been received by service device interface module 102 from service device 120, operation of the process continues to step S626; otherwise, operation of the process continues to step S624.

In step S624, service device interface module 102 may transmit an AHB HREADY signal with a wait state de-asserted, i.e., bridge memory 110 can accept data, and operation of the process continues to step S614.

In step S626, service device interface module 102 may transmit an AHB HREADY signal with a wait state asserted to service device 120, and operation of the process continues to step S628.

In step S628, service device interface module 102 may continue to periodically transmit an AHB HREADY signal with a wait state asserted to service device 120 while waiting for a notification from crossbar bus interface module 106, and/or outbound transfer monitor 108, that the last bit of the data transfer was successfully transferred from SOC bridge module 100, and operation of the process continues to step S630.

In step S630, service device interface module 102 may receive the awaited notification from crossbar bus interface module 106, and/or outbound transfer monitor 108, that the last bit of the data transfer was successfully transferred from SOC bridge module 100, and operation of the process continues to step S632.

In step S632, service device interface module 102 may transmit an AHB HREADY signal with a wait state de-asserted to service device 120, and operation of the process continues to step S634 and terminates.

Figure 8:
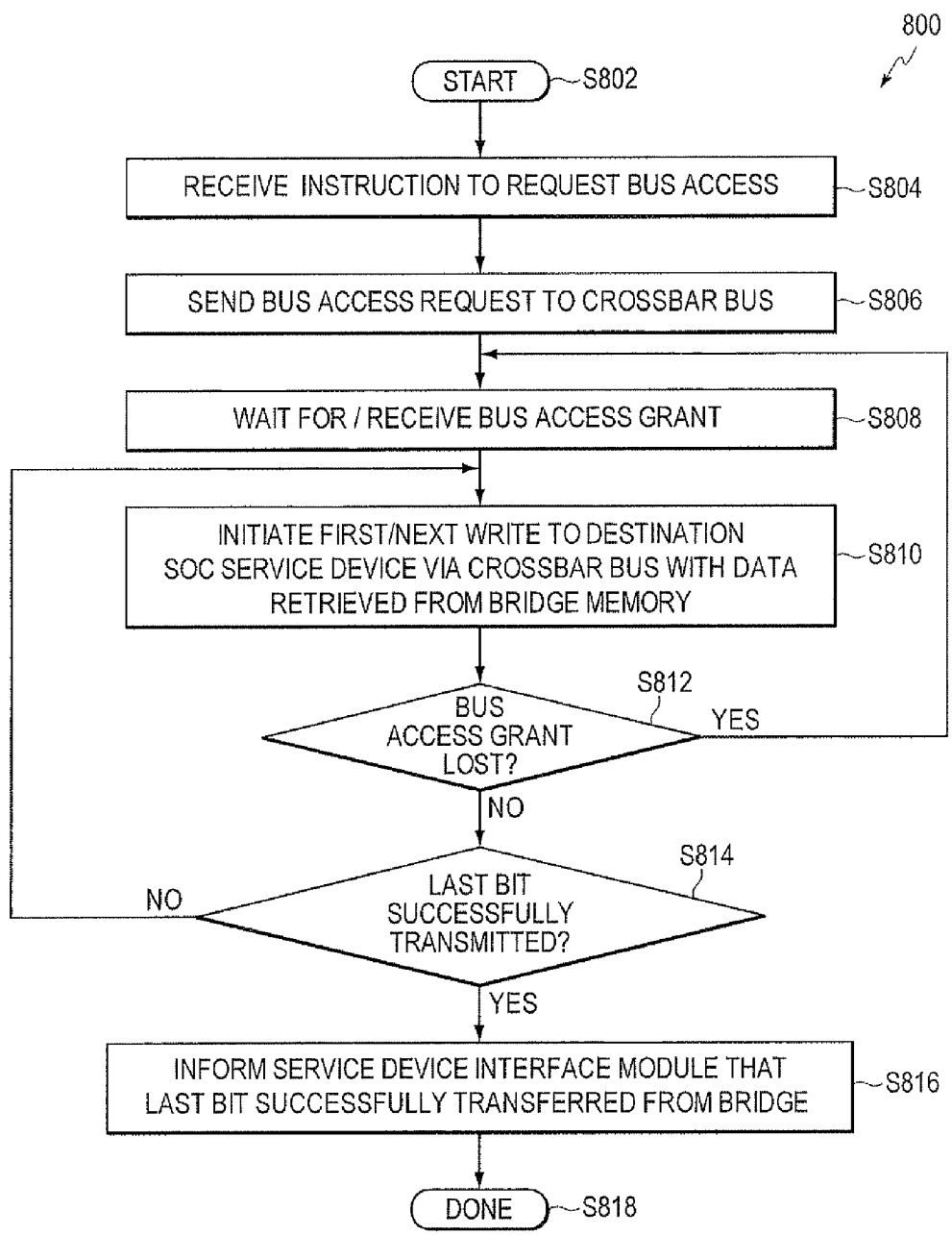
FIG. 8 is a flow-chart of an example process flow that may be performed by the SOC crossbar bus interface module of FIG. 2.

FIG. 8 is a flow-chart of an example process flow that may be performed by the SOC crossbar bus interface module 106 of FIG. 2 in support of a data write transfer, from a service device 120, through SOC Bridge module 100 and SOC crossbar bus 124 to a destination SOC service device. As shown in FIG. 8, operation of process 800 begins at step S802 and proceeds to step S804.

In step S804, crossbar bus interface module 106 may receive an instruction from service device interface module 102 to request crossbar bus access for a write data transfer, and operation of the process continues to step S806.

In step S806, crossbar bus interface module 106 may send a bus access request to SOC crossbar bus 124 via the crossbar bus interface 112, and operation of the process continues to step S808.

In step S808, crossbar bus interface module 106 may wait for and receive a bus access grant from arbiter 148 of SOC crossbar bus 124, and operation of the process continues to step S810.

In step S810, crossbar bus interface module 106 may initiate a first/next write to a destination SOC service device via SOC crossbar bus 124 with data retrieved from bridge memory 110, and operation of the process continues to step S812.

If, in step S812, crossbar bus interface module 106 determines that bus access has been temporarily lost to an SOC service device with a higher priority transfer, operation of the process continues to step S808; otherwise, operation of the process continues to step S814.

If, in step S814, crossbar bus interface module 106 determines, e.g., with assistance from outbound transfer monitor 108, as described above, that the last bit of the data transfer has been successfully transferred from SOC bridge module 100, as described above, operation of the process continues to step S816; otherwise, operation of the process continues to step S810.

In step S816, crossbar bus interface module 106 may inform service device interface module 102 that the last bit of the data transfer has been successfully transferred from SOC bridge module 100, and operation of the process continues to step S818 and terminates.

Figure 9:
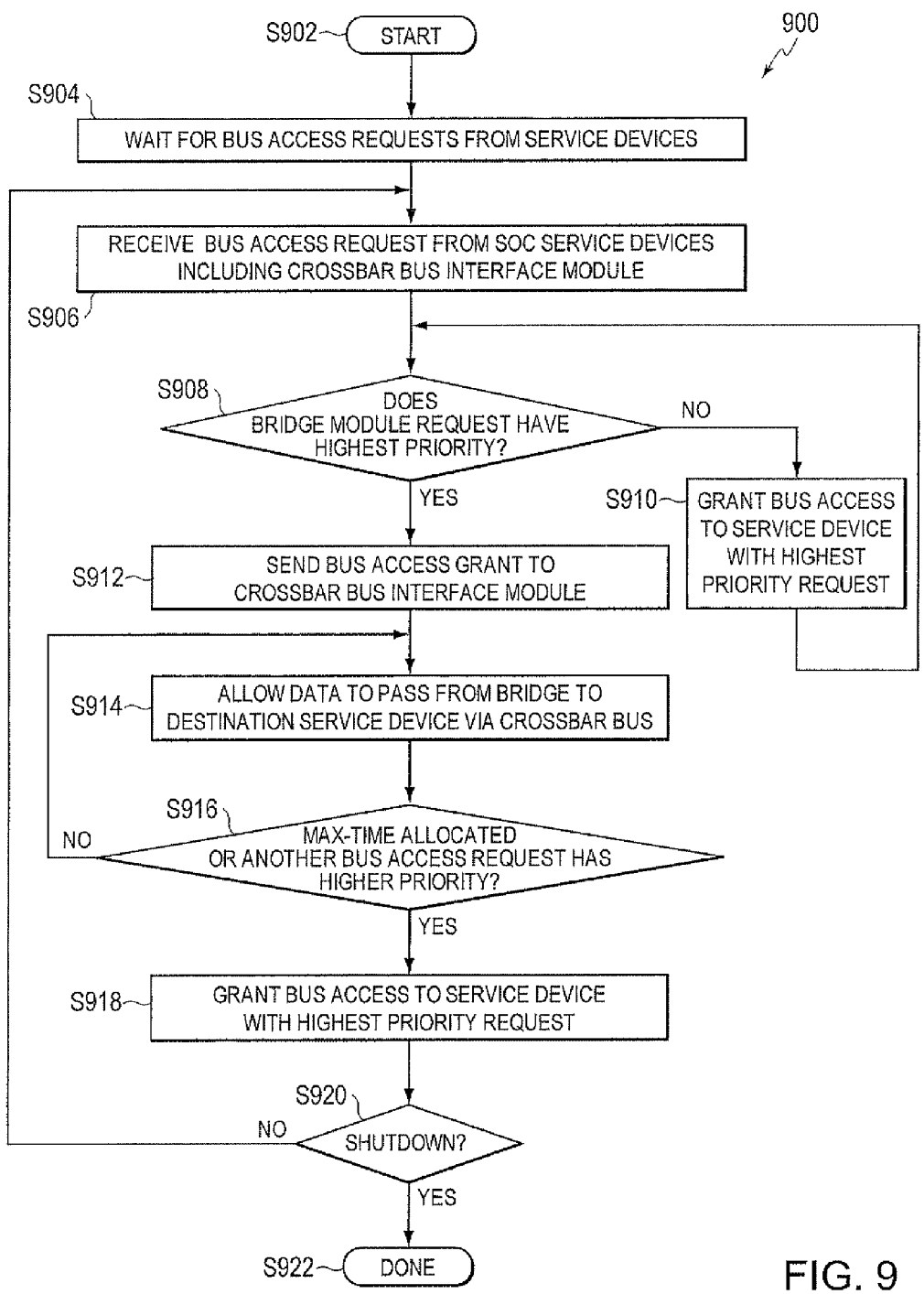
FIG. 9 is a flow-chart of an example process flow that may be performed by the SOC crossbar bus of FIG. 3.

FIG. 9 is a flow-chart of an example process flow that may be performed by the SOC crossbar bus 124 as described above with respect to FIG. 3 in support of a data write transfer, from a service device 120, through SOC bridge module 100 and SOC crossbar bus 124 to a destination SOC service device. As shown in FIG. 9, operation of process 900 begins at step S902 and proceeds to step S904.

In step S904, crossbar bus 124 may wait for bus access requests from the respective SOC service devices included in the SOC system, and operation of the process continues to step S906.

In step S906, crossbar bus 124 may receive bus access requests from SOC service devices including crossbar bus interface module 106, and operation of the process continues to step S908.

If, in step S908, arbiter 148 of crossbar bus 124 determines that the bus access request received from crossbar bus interface module 106 has the highest priority, operation of the process continues to step S912; otherwise, operation of the process continues to step S910.

In step S910, arbiter 148 of crossbar bus 124 may grant bus access to a service devices other than crossbar bus interface module 106, and operation of the process continues to step S908.

In step S912, arbiter 148 of crossbar bus 124 may grant bus access to crossbar bus interface module 106, and operation of the process continues to step S914.

In step S914, arbiter 148 of crossbar bus 124 may allow data to transfer from crossbar bus interface module 106 to a destination SOC service device via crossbar bus 124, and operation of the process continues to step S916.

If, in step S916, arbiter 148 of crossbar bus 124 determines that the time that the crossbar bus has been allocated to crossbar bus interface module 106 exceeds a maximum allowed access time, or arbiter 148 determines that a bus access request from another SOC service device has higher priority, operation of the process continues to step S918; otherwise, operation of the process continues to step S914.

In step S918, arbiter 148 of crossbar bus 124 may grant bus access to a service devices other than crossbar bus interface module 106, and operation of the process continues to step S920.

If, in step S920, a power shutdown or restart of the SOC system is detected, operation of the process continues to step S922 and the process terminates; otherwise, operation of the process continues to step S906.

In the embodiments described above, the SOC crossbar bus and the respective SOC service modules are considered to be closed modules, i.e., modules that are barred from being modified due to contractual, legal or design concerns. Therefore the described functionality is implemented in modules other than the SOC crossbar bus and the respective SOC service modules. However, nothing in this disclosure should be interpreted as preventing the addition of portions of the described functionality in one of more of the SOC crossbar bus and an SOC service module, and/or being added portions of the described functionality via modifications to the a crossbar bus interface protocol, such as the AHB interface, if such modules and/or protocols are determined to not be closed.

Although inbound transfer monitor 104 and outbound transfer monitor 108 are referred to as separate modules in the exemplary embodiment described above, inbound transfer monitor 104 and outbound transfer monitor 108 may be referred to individually and collectively as a data transfer monitor.

For purposes of explanation in the above description, numerous specific details are set forth in order to provide a thorough understanding of the described SOC bridge that applies a adapted delay, or latency, to data transfers across the bridge to avoid data corruption without reducing data transfer performance. It will be apparent, however, to one skilled in the art that the described SOC bridge that applies an adapted data transfer delay may be practiced without these specific details. In other instances, various structures and devices are shown in block diagram form in order to avoid obscuring the features of the described SOC bridge.

While the SOC bridge that applies an adapted data transfer delay has been described in conjunction with the specific embodiments thereof, it is evident that many alternatives, modifications, and variations will be apparent to those skilled in the art. Accordingly, embodiments of the SOC bridge, as set forth herein, are intended to be illustrative, not limiting. There are changes that may be made without departing from the spirit and scope of the invention.

What is claimed is:

1. A system-on-a-chip comprising:
a crossbar bus providing connectivity between a first service device and a plurality of second service devices; and
a bridge module disposed between the crossbar bus and the first service device the bridge module being configured to:
receive a block of data from the first service device and to forward the received block of data via the crossbar bus to a selected second service device;
periodically provide a wait signal to the first device to assert a wait state after a data transfer transaction has commenced for the block of data and until completion of a data transfer transaction for the block of data, the wait state continuing after the bridge module has received the block of data from the first service device; and
signal deassertion of the wait state to the first service device based on receipt of an acknowledgement that the block of data has been received by the selected second service device.

2. The system-on-a-chip of claim 1, wherein the bridge module is further configured to receive the block of data from the first service device in accordance with a first interface protocol and to forward the received block of data in accordance with a second interface protocol.

3. The system-on-a-chip of claim 2, wherein the first interface protocol is based on an Advanced High-performance Bus interface protocol, and a data transfer monitor suppresses a data transfer complete signal by sending an Advanced High-performance Bus HREADY signal that asserts a wait state.

4. The system-on-a-chip of claim 2, wherein the first interface protocol is based on an Advanced High-performance Bus interface protocol, and a data transfer complete signal is triggered by an Advanced High-performance Bus HREADY signal that de-asserts a wait state.

5. The system-on-a-chip of claim 1, wherein the second service device is one of a double data rate (DDR) dynamic random access memory (DRAM) memory unit, a computer networking interface device, a local device interface that supports connectivity to local input/output devices, an extended system bus interface, and an input/output interface.

6. The system-on-a-chip of claim 1, further comprising:
a data transfer monitor associated with the bridge module, the data transfer monitor being configured to monitor a transfer state of the block of data from the first service device to the second service device via the bridge module and to cause the bridge module to provide a data transfer complete signal to the first service device that is indicative of a completed transfer of the received block of data based on the monitored transfer state, the data transfer complete signal deasserting the wait state.

7. The system-on-a-chip of claim 6, wherein the data transfer monitor is configured to monitor an egress of the block of data from the bridge module, and to determine that a transfer state of the block of data is completed based upon egress of the block of data from the bridge module.

8. The system-on-a-chip of claim 6, wherein the data transfer monitor is configured to suppress a data transfer complete signal from a time of ingress of the block of data to the bridge, and configured to assert the data transfer complete signal upon determining that the block of data has been transferred.

9. The system-on-a-chip of claim 8, wherein the data transfer monitor is configured to assert the data transfer complete signal upon determining that the block of data has been transferred based upon determining that the block of data has egressed from the bridge module.

10. The system-on-a-chip of claim 6, wherein the data transfer monitor is configured to monitor an ingress of the block of data to the bridge module.

11. The system-on-a-chip of claim 10, wherein the data transfer monitor monitors the ingress of the block of data to the bridge module by comparing a count of bits received from the first service device to a known size of the data transfer.

12. The system-on-a-chip of claim 11, wherein the data transfer monitor determines that the block of data has egressed from the bridge module based on the acknowledgment from the second service device indicating receipt of a portion of the block of data that contained a determined last bit associated with the data transfer.

13. A method of controlling a duration allowed by a first service device for a data transfer from the first service to a plurality of second service devices via a bridge module and a crossbar bus on a system-on-a-chip, the method comprising:
providing connectivity between the first service device and the second service devices by the crossbar bus;
receiving, by the bridge module, a block of data from the first service device and forwarding the received block of data via the crossbar bus to a selected second service device;
periodically providing a wait signal to the first device to assert a wait state after a data transfer transaction has commenced for the block of data and until completion of a data transfer transaction for the block of data, the wait state continuing after the bridge module has received the block of data from the first service device; and
signaling deassertion of the wait state to the first service device based on receipt of an acknowledgement that the block of data has been received by the selected second service device.

14. The method of claim 13, wherein the receiving the block of data from the first service device is according to a first interface protocol and the forwarding the received block of data is according to a second interface protocol.

15. The method of claim 13, further comprising:
monitoring, by a data transfer monitor, a transfer state of the block of data from the first service device to the second service device via the bridge module; and
causing the bridge module to provide a data transfer complete signal to the first service device that is indicative of a completed transfer of the received block of data based on the monitored transfer state, the data transfer complete signal deasserting the wait state.

16. The method of claim 15, further comprising:
monitoring an egress of the block of data from the bridge module; and
determining that a transfer state of the block of data is transfer completed based upon egress of the block of data from the bridge module.

17. The method of claim 15, further comprising:
suppressing a data transfer complete signal from a time of ingress of the block of data to the bridge; and asserting the data transfer complete signal upon determining that the block of data has been transferred.

18. The method of claim 17, further comprising:
asserting the data transfer complete signal upon determining that the block of data has been transferred based upon determining that the block of data has egressed from the bridge module.

\* \* \* \* \*